United States Patent

Foltz

[15] 3,679,913

[45] July 25, 1972

[54] BINARY FLIP-FLOP EMPLOYING INSULATED GATE FIELD EFFECT TRANSISTORS AND SUITABLE FOR CASCADED FREQUENCY DIVIDER OPERATION

[72] Inventor: James W. Foltz, Scottsdale, Ariz.

[73] Assignee: Motorola, Inc., Franklin Park, Ill.

[22] Filed: Sept. 14, 1970

[21] Appl. No.: 71,889

[52] U.S. Cl. ..............................307/279, 307/205, 307/225, 307/238, 307/251, 307/289, 307/293, 307/173

[51] Int. Cl. ..........................................................H03k 3/26

[58] Field of Search.................307/205, 251, 238, 279, 289, 307/293, 304, 215, 225; 340/173

[56] References Cited

UNITED STATES PATENTS

| | | | |
|---|---|---|---|
| 3,348,214 | 10/1967 | Barbetta | 307/238 X |
| 3,417,265 | 12/1968 | Lee | 307/289 X |
| 3,484,625 | 12/1969 | Booher | 307/205 X |
| 3,549,904 | 12/1970 | Rapp | 307/279 X |

*Primary Examiner*—Stanley T. Krawczewicz
*Attorney*—Mueller & Aichele

[57] ABSTRACT

A toggle flip-flop suitable for cascaded operation is shown with performs a sequential logic function. More specifically, the future state of the flip-flop depends on its past occurrences and therefore the disclosed flip-flop performs a memory function. This invention realizes the toggle function through an interconnection of two basic functional blocks. One block comprises a memory means and the other an output transfer means. The invention herein described is a circuit utilizing complementary insulated gate field effect transistors which perform the toggle flip-flop function. The circuit requires an input excitation (a voltage) and its inverse, and its operation is independent of the input width and rise time.

12 Claims, 12 Drawing Figures

INVENTOR.
James W. Foltz

BY Mueller & Aichele

ATTY'S

INVENTOR.
James W. Foltz
BY Mueller & Aichele
ATTY'S.

INVENTOR.
James W. Foltz
BY Mueller & Aichele
ATTY'S

BINARY FLIP-FLOP EMPLOYING INSULATED GATE FIELD EFFECT TRANSISTORS AND SUITABLE FOR CASCADED FREQUENCY DIVIDER OPERATION

BACKGROUND OF THE INVENTION

In the area of digital systems, it is desirable to realize a bistable memory element which changes its state every time an input excitation is applied. This type of element is sometimes called a binary or toggle flip-flop. It is useful in many of the components of a digital system such as counters, multiplexers, shift registers, and others. It can also be used as a frequency divider, for it will divide the frequency of the input excitation by two.

Prior art circuitry has achieved this funtion generally through the use of a number of bipolar transistors in cross coupled configurations in addition to several resistive and capacitive components. While such a circuit performs the toggle function, it does, however, consume current from its power source during its quiescent state as well as during switching. As digital systems become more critical of power dissipation and in particular as more digital systems demand battery operation, this becomes an intolerable drawback.

To realize a solution to this problem, digital circuitry designed for application in these areas has begun to convert to the use of insulated gate field effect transistors. Insulated gate field effect transistors are useful here mainly because they do not require a current drive to cause them to conduct as bipolar devices do, but rather are voltage controlled devices. These devices are also appealing because they eliminate the requirement for resistive and capacitive components.

Insulated gate field effect circuits have been designed which achieve the toggle function using devices of one conduction type and using devices of both conduction types in the same circuit. Circuits of the first variation still consume some current in the quiescent state, however circuits using complementary insulated gate field effect transistors can be designed to have zero power consumption in the quiescent state and extremely low power consumption during switching. The resulting power consumption becomes dependent on circuit mode capacitances and hence on the number of devices required. Prior art circuits generally, however, have demanded specially timed control signals, have depended on a specific value or range of values of some of the device parameters for their operation, or have provided outputs which were unsatisfactory for triggering a succeeding stage when used as a cascaded frequency divider.

SUMMARY OF THE INVENTION

This invention relates to digital circuitry, and more particularly to triggerable binary flip-flops which consume very small amounts of power and are appropriate for use as a cascaded frequency divider.

Accordingly, it is an object of this invention to provide a new and improved triggerable binary or toggle flip-flop circuit.

It is a further object of this invention to provide a new and improved triggerable binary or toggle flip-flop circuit which operates with extremely low power consumption.

It is another object of this invention to provide new and improved circuitry appropriate for a cascaded frequency divider which will divide any given frequency by a factor which is the number 2 raised to any power, and which operates with extremely low power consumption.

It is another object of this invention to provide a new and improved triggerable binary or toggle flip-flop circuit which is comprised solely of transistors and can be readily integrated.

It is another object of this invention to provide a new and improved triggerable binary or toggle flip-flop circuit which utilizes insulated gate field effect transistors of both conduction types.

These and other objects and features of this invention will become fully apparent in the following description of the accompanying drawings, wherein.

BRIEF DESCRIPTION OF THE INVENTION

A toggle flip-flop is shown which performs a sequential logic function. More specifically, the future state of the flip-flop depends on its past occurrences and therefore the disclosed flip-flop performs a memory function. This invention realizes the toggle function through an interconnection of two basic functional blocks. One block comprises a memory means and the other an output transfer means. The invention herein described is a circuit utilizing complementary insulated gate field effect transistors which performs the toggle flip-flop function in a manner superior in many ways to the prior art circuits. The circuit requires an input excitation (a voltage) and its inverse, and its operation is independent of the input width and rise time. There are no circuit limitations on switching speed and at no time in the switching cycle is any point in the circuit particularly critical of specific device parameters. Both the output and its inverse are available. No additional control signals are required and consequently for use as a cascaded frequency divider, the outputs of one flip-flop are connected to the inputs of the next. The circuit requires a minimum number of active devices which perform the toggle function in this fashion and thus requires the least amount of operating power. It requires no passive components and consequently can be readily integrated, further reducing the power consumption due to a reduction in circuit size and resulting circuit capacitances.

DETAILED DESCRIPTION OF THE DRAWINGS

Figure 1:
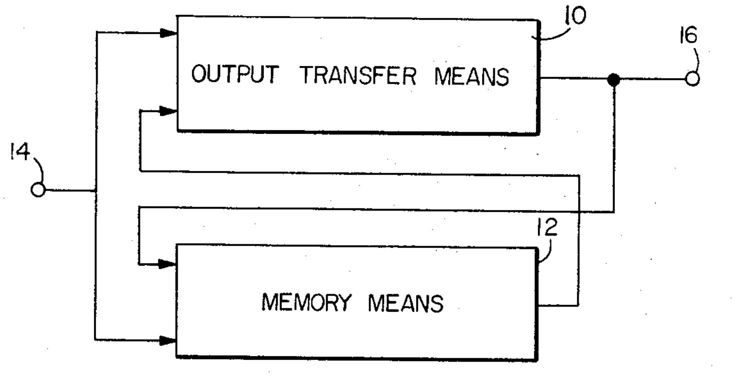
FIG. 1 is a functional block diagram of one cell employed in the present invention.

Referring to FIG. 1, there can be seen a functional block diagram of the present invention. Each flip-flop cell of the present invention comprises an output transfer means 10 and a memory means 12. The input signal is available at a terminal 14 and the output signal is available at a terminal 16. The input signal available at the terminal 14 is applied as an input to the output transfer means 10 and to the memory means 12. The second input to the output transfer means is the output of the memory means 12. The second input to the memory means 12 is the output of the output transfer means 10. The output of the memory means block 12 is defined as the flip-flop output and has two stable states hereinafter referred to as high or low. The function of the transfer means is to change the output, upon command from the input signal, from its present state to the opposite state and to hold the output in this new condition after the input command has been removed. The fact that the transfer means 10 holds the level of the output signal in its new state after the input command signal is removed indicates that the previous state of the signal is stored and is continuously available. This storage capability is supplied by the memory means block 12.

The two functional blocks 10 and 12 are implemented by an interconnection of non-sequential or combinational logic blocks. The fundamental logic blocks utilized are shown in FIGS. 2A through 2C and their respective operation is hereinafter described.

Figure 2A:
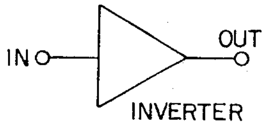
FIGS. 2A, 2B and 2C show the logic blocks utilized in the present invention.

Referring to FIG. 2A, there is shown a representation of an inverter circuit employed in the instant invention. In the discussion of these and the remaining circuits, a positive true logic definition is assumed. More specifically, a high voltage or current level is a logical one while a lower voltage or current level is a logical zero. The inverter operation is standard. More specifically, when the input level is high, the output level is low and when the input level is low, the output level is high.

Figure 2B:
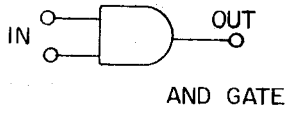

Referring to FIG. 2B, there is shown a dual input AND gate employed in the present invention. It has two input lines and one output line. When both inputs to the AND gate are high, the output is high. If, however, one or both of the inputs are low, the output is low.

Figure 2C:
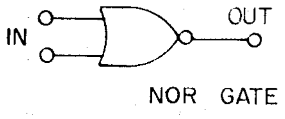

Referring to FIG. 2C, there is shown a dual input NOR gate employed in the present invention. The dual input NOR gate has two input lines and one output line. If one or both of the inputs is high, the output is low. If both inputs are low, the output is high.

Figure 3:
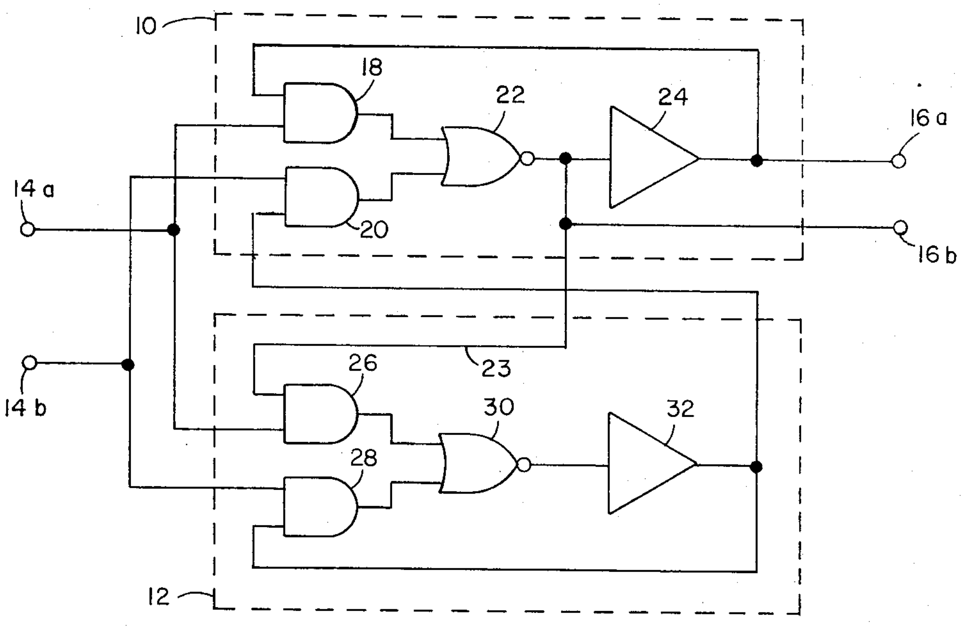
FIG. 3 shows the connection of the logic blocks shown in FIGS. 2A through 2C into the functional configuration shown in FIG. 1.

The specific interconnection of the logic blocks shown with reference to FIGS. 2A, 2B and 2C which is employed for connecting up into the embodiment of the present invention is shown in FIG. 3. The output transfer block 10 comprises a pair of input AND gates 18 and 20. The output from each of the AND gates 18 and 20 is applied to a NOR gate 22. The output from the NOR gate 22 is applied to an inverter stage 24, to one output terminal **16*b* and as one input to an AND gate 26 located in the memory block 12. The memory block 12 further comprises a second input AND gate 28. The output from the input AND gates 26 and 28 in the memory block 12 is applied to a NOR gate 30. The output from the NOR gate 30 is applied to an inverter 32. The output from the inverter 32 is applied as the second input signal to the AND gate 28 and as one input signal to the AND gate 20 in the output transfer block 10. The input signal is available at the input terminal 14 and is divided into the input signal available at the terminal 14*b* and the inverse of the input signal available at the terminal 14*a*. The input signal at the terminal 14*b* is applied as a second input to the AND gate 20 and as the first input to the AND gate 28. The inverse of the input signal available at the terminal 14*a* is applied as the one input to the AND gate 18 and as the second input to the AND gate 26. The output of the inverter 24 is applied as the second input to the AND gate 18 and is applied to the output terminal 16*a* as the output signal. The inverse of the output signal is available at the terminal 16*b*. The circuit shown in FIG. 3** performs a toggle flip-flop function of the type shown in the following analysis and hereinafter is referred to as the basic flip-flop cell employed in the instant invention.

For the purpose of analyzing the operation of the flip-flop stage employed in the present invention, the input signal and its inverse are given as square voltage waveforms making very fast transistions between the low and high voltage levels. These waveforms are shown on lines A and B of FIG. 4, respectively. Line A corresponds to the signal at terminal **14*b* while line B corresponds to the signal at terminal 14*a*. The output waveform and its inverse are determined in the following analysis and are shown on lines C and D respectively, where line C corresponds to the signal at terminal 16*a* and line D corresponds to the signal at terminal 16*b*. The analysis is divided into five periods determined by the state of the input signal and covering two complete cycles of that signal. The following analysis is described with reference to FIGS. 3 and 4. During the first analysis cycle, initial states of the output transfer block and memory blocks 10 and 12 must be assumed. The output signal from terminals 16*a* and 16*b* is either in one of two stable states. More specifically, the output signal from that terminal 16*a* is high and the output signal from terminal 16*b* is low, or the output signal from terminal 16*a* is low and the output signal from 16*b* is high. For the purposes of further description, it is assumed that the output signal at terminal 16*a* is high and that the inverse output signal at terminal 16*b* is low. The output from the memory block 12 can also be either high or low and for the purposes of this description, the output signal from the memory block 12 is assumed to be low. Accordingly, during the first analysis period shown as the time period from 0 to 1, with reference to FIG. 4, line D, the output of the AND signals are high. Regardless of the second input condition of the NOR gate 22, the high output signal from the AND gate 18 forces the output of the NOR gate 22 to be low. The output signal from the NOR gate 22 is applied to the output terminal 16*b* as a low signal and is also applied as the input to the inverter 24 causing the output signal at the terminal 16*a* to be high. Because one or both of the inputs of AND gates 20, 26 and 28 are low, then the outputs of each of the AND gates are low. Accordingly, since both of the inputs of NOR gate 30 are low, its output is high. An inverter 32, accordingly, has a low output signal. The signal at the output of the inverter 32 is shown as line E in FIG. 4 and is the output of the memory means. In this manner, the assumed states of operation of the logic block shown in FIG. 3 have been confirmed and the flip-flop is in a stable state. The condition of the flip-flop circuit shown with reference to FIG. 3, is as follows: the inverse output signal available on terminal 16*b* is low; the output signal available on terminal 16*a* is high; nd the output signal from the inverter 32** is low.

Figure 4:
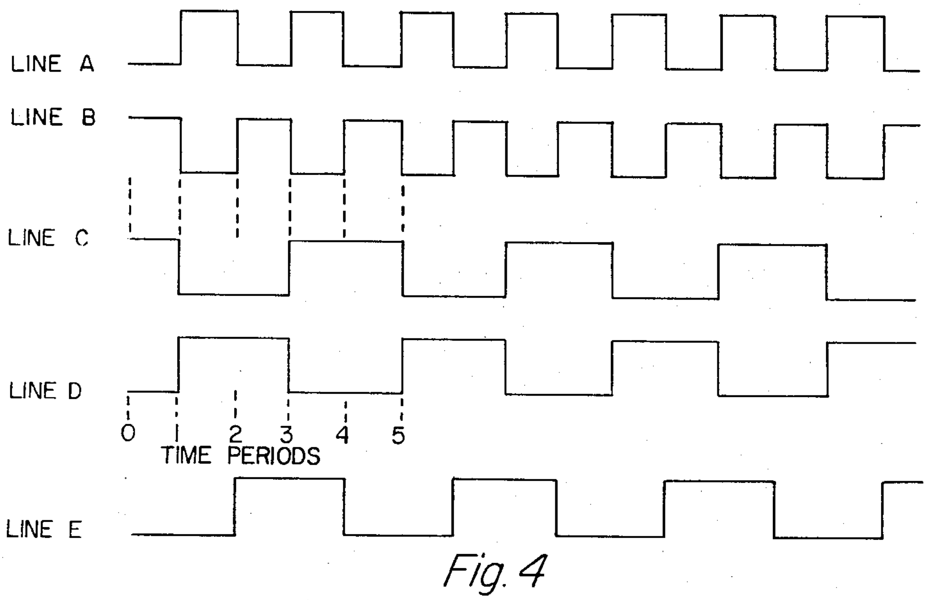
FIG. 4 shows the input and output waveforms of the device shown in FIG. 3.

In the second analysis period indicated as the time from 1 to 2 in FIG. 4, the signal available at the terminal **14*b* has undergone a transition to a high level, and the signal available at the terminal 14*a* has switched to its low level. The following changes take place within the circuit shown in FIG. 3. Since one of the input applied to the AND gate 18 available from the terminal 14*a* goes low, the output of the AND gate 18 goes low. The output signal from the AND gate 20 has not changed because one of its input signals applied from the output of the inverter 32 is still low. The output of the NOR gate 22 goes high. The output signal from the NOR gate 22 is applied as an input to the AND gate 26. Since the second input signal to the AND gate 26 is low, the output signal from the AND gate 26 is low and is applied as an input to the NOR gate 30. The output signal from the NOR gate 30 is high and accordingly the output from the inverter 32 is low. The output signal from the NOR gate 22 is also applied as the input to the inverter 24. Since the output from the NOR gate 22 is high, the output signal from the inverter 24 is low and accordingly, the output signal available on the terminal 16*a* is low. The AND gates 26 and 28 do not change their states since one of the inputs to the gate 26 is now low due to the inverse of the input signal available at the terminal 14*b* and one of the inputs to the gate 28 is still low due to the output of the inverter 32. The flip-flop output state has changed but the output of the memory section 12 has remained in its previous state. This is consistent with the waveform shown in FIG. 4 available at line E showing the output from the inverter 32**.

In the third analysis period (from 2 to 3) the input signal available at the terminal **14*b* once again goes low while its inverse available at the terminal 14*a* goes high. The AND gate 18 has one of its input signals still low due to the output signal of the inverter 24 so its output signal applied to the NOR gate 22 remains low. The AND gate 20 has one of its input signals low from the signal applied thereto from the terminal 14*b* so its output signal applied to the NOR gate 22 remains low. The output signal from the NOR gate 22 remains high, holding the output signal available at the terminal 16*b* high and the signal applied as the input to the inverter 24 is high, thereby holding the output signal available at the terminal 16*a* low. The AND gate 26, however, has both of its input signals high due to one input signal available from the output of the NOR gate 22 and the second input signal available from the input terminal 14*a*. Accordingly, its output signal applied to the NOR gate 30 is high. The high output signal applied as one of the input signals to the NOR gate 30 causes the output from the NOR gate 30** to go low and the low output signal is applied as the input to the inverter 32. The output signal available from the inverter 32 goes high. The flip-flop output signal then has not changed state but the output signal from the memory block 12 has gone from low to high.

The input signal available at the terminal 14*b* again goes high in the fourth period while the inverse of the input signal goes low, one AND gate 20 now has both of its input signals high. One of which is the output signal from the inverter 32 and a second of which is available at the input terminal 14*b*. The output signal from the AND gate 20 consequently goes high. This high output signal is applied as an input to the NOR gate 22 causing the output of the NOR gate 22 to go low causing the output signal available at the terminal 16*b* to go low. The low output signal from the NOR gate 22 applied through the inverter 24 and causes the output terminal 16*a* to go high. The output of the AND gate 28 now goes high because its inputs are both high, the first of which is the output from the inverter 32 and the second of which is the input signal available on the terminal 14*b*. The output signal from the AND gate 28 is applied as an input to the NOR gate 30 causing the output from the NOR gate 30 to stay low. The output signal from the NOR gate 30 is inverted in the inverting circuit 32 causing the output of the memory block 12 to be high. The output of the AND gate 26 is now low because its input signal applied from the terminal 14*a* is low. During the fourth period then the output of the flip-flop has changed state but the memory section has remained unchanged.

In the fifth period, the input signal available on the input terminal 14*b* goes low and the inverse of the input signal available on terminal 14*a* goes high. This causes the output of the AND gate 18 to go high due to the signals available from the terminal 14*a* and the output of the inverter 24. The high output signal from the AND gate 18 holds the output of the NOR gate 22 low which is available as the output signal at the terminal 16*b*. The signal available at the terminal 16*a* is held high because of the inverter action of the inverter 24. The low input signal available from the terminal 14*b* and applied to the AND gate 20 keeps the output from the AND gate 20 low. In a like manner, the output of the AND gate 26 is held low due to its low input signal available from the output of the NOR gate 22. The AND gate 28 also has a low input because of the signal available at the terminal 14*b*. The output from the AND gate 28 is accordingly a low output signal. The output signal from the AND gate 28 is applied to the NOR gate 30. The output of the NOR gate 30 is a high signal applied to the inverter 32 causing the output signal from the inverter 32 to go low. After the fifth analysis period, the variables in the circuit shown in FIG. 3 are in the following states: The output signal available at the terminal 16*b* is low, the output signal available at the output terminal 16*a* is high, the output signal from the inverter 32 is low, the input signal available at the terminal 14*b* is low and the inverse of the input signal available at the terminal 14*a* is high. This is identical to the assumed states during the discussion of analysis period one. Two full periods of the input signal have thus been analyzed and one full period of the output signal has been determined. As can be seen with reference to FIG. 3, the flip-flop output changes state every time the input signal available at the terminal 14*b* goes from the low to the high state and the signal available at the terminal 14*a* consequently goes from the high to the low state.

Figure 5:
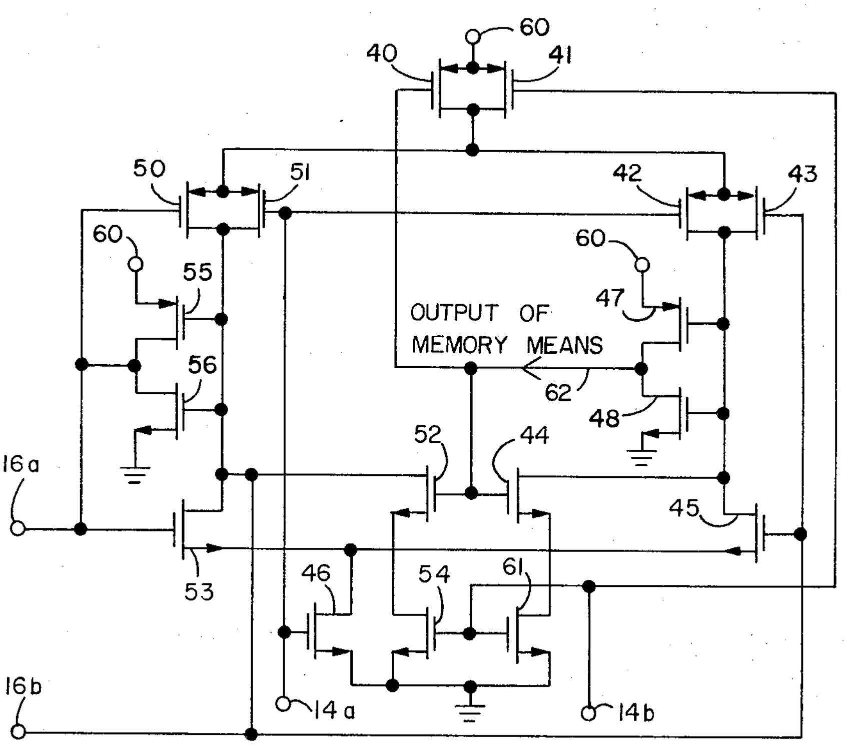
FIG. 5 shows an improved schematic implementation using field effect transistors of the circuit shown in FIG. 3.

The device illustrated by the interconnection of the logic blocks shown in FIG. 3 performs the toggle flip-flop function and divides the frequency of the input signal by two. The combinational logic block embodiment of the toggle flip-flop is further implemented using a plurality of insulated gate field effect transistors (IGFETs) of both conduction types, i.e., P channel and N channel. This embodiment of the instant invention is shown in FIG. 5 and comprises the preferred embodiment of the toggle flip-flop. The circuit shown in FIG. 5 is comprised of two sections, a memory means section and an output transfer means section. The memory means section of the circuit shown in FIG. 5 is divided into two portions. The first portion consists of transistors 40, 41, 42, 43, 44, 45, 46, and 61. These transistors perform the function of the dual input AND gates and the NOR gates 26, 28 and 30, respectively shown in FIG. 3. The second portion of the memory section comprises the transistors 47 and 48 which perform the function of the inverter block 32 shown in FIG. 3.

Figure 6:
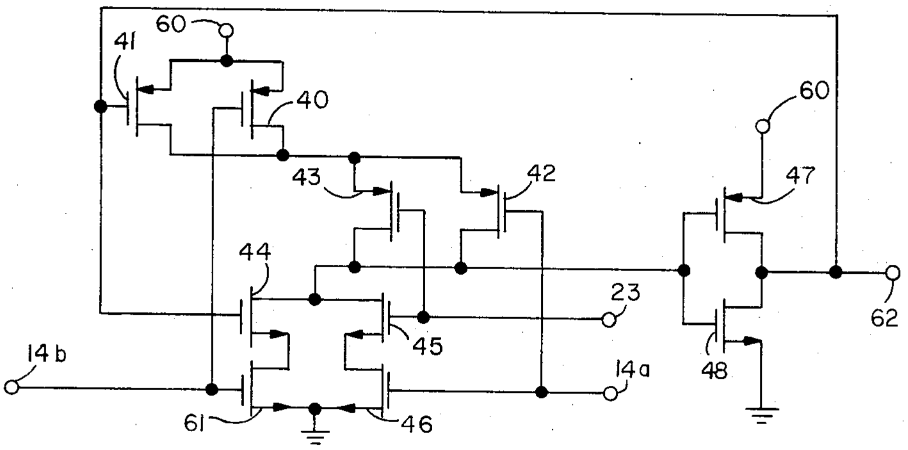
FIG. 6 shows a schematic diagram of that portion of the circuit shown in FIG. 5 which operates to perform the memory function.
Figure 7:
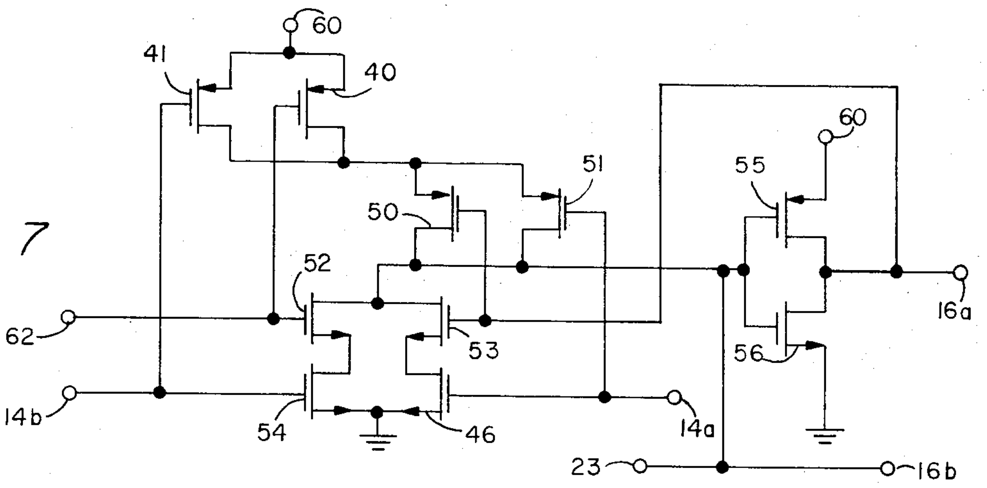
FIG. 7 shows a schematic diagram of that portion of the circuit shown in FIG. 5 which operates to perform the output transfer function.

Similarly, the output transfer means 10 consists of two sections, the first of which comprises transistors 40 and 41, 50 and 51, 52, 53 and 54, and 46, respectively. This section of the output transfer block 10 performs the function of the input AND gates 18 and 20 and the NOR gate 22 shown with reference to FIG. 3. The second section of the output transfer means 10 comprises the transistors 55 and 56 and performs the function of the inverter 24 shown in FIG. 3. It should be noted that transistors 40, and 41, 46 operate in a dual manner in both the output transfer means and the memory block means portions of a toggle flip-flop. The reason certain transistors have dual functions is as follows: for greater clarity, the various memory means portion and the output transfer means portion 12 of the circuit shown in FIG. 5 are divided out and shown as separate Figures in FIGS. 6 and 7, respectively. The fact that several devices appear in both functional blocks is one of the reasons for the particular economy in terms of total number of devices required with which this invention performs the toggle flip-flop function.

Figure 8:
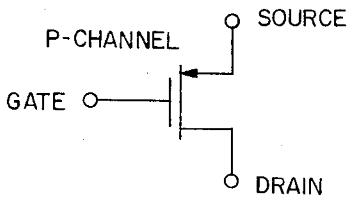
FIG. 8 shows a schematic representation of a P-channel field effect transistor.
Figure 9:
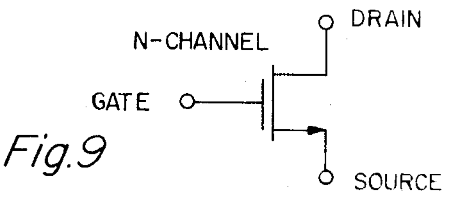
FIG. 9 shows a schematic representation of an N-channel field effect transistor.

FIGS. 8 and 9 define the schematic representation of P-channel and N-channel MOS field effect transistors, respectively. The source, gate and drain terminals which are analogous to the emitter, base and collector of a bipolar transistor are labelled. An N-channel device is turned "on," i.e., is capable of passing current from drain to source, if the voltage at the gate is more positive than the voltage at the source by at least an amount equal to the threshold voltage. A P-channel device is on, i.e., can pass current from source to drain, if the gate voltage is more negative than the source voltage by at least an amount equal to the threshold voltage. At all times in this circuit, P-channel devices will be turned on by causing the voltage at the source terminal to be equal to the positive supply voltage and the voltage at the gate terminal to be equal to the ground level, or zero volts. This, of course, causes the voltage at the gate to be more negative than the voltage at the source by an amount equal to the supply voltage. No voltages below the zero or ground level are possible in this circuit. It will be assumed that the supply voltage is at least twice the magnitude of the threshold voltage and that the threshold voltages of the P and N channel devices are approximately equal.

The toggle flip-flop requires an input signal and the inverse of that signal. Inverse is used here to mean "of opposite magnitude," i.e., when the input signal is caused to become a value equal to +Vcc volts, then the inverse signal must become zero volts. Likewise, when the input signal is zero volts, the inverse signal must be the +Vcc volts. The signals move through transition periods simultaneously. The input and its inverse are labelled T (14*b*) and T′ (14*a*) on the diagram.

Two outputs are supplied by the flip-flop. These outputs are labelled Q (16*a*) and Q′ (16*b*) and may reside in one of two stable states. Either Q (16*b*) may be at a value nearly (except for a very small saturation voltage) equal to +Vcc volts and Q′ be equal to zero volts, or Q′ may be equal to +Vcc volts and Q be equal to zero volts. Q′ is the inverse of Q. A load may be connected between either Q or Q′ and ground, or both outputs are loaded simultaneously. The latter is the case if the output of one flip-flop is used to drive the input of another.

To begin the analysis, one of the stable states is assumed; Q high, Q′ low. "High" will henceforth mean "at a potential equal to +Vcc volts" measured from ground level. "Low" means at zero volts, or "ground level." The analysis is divided into five periods determined by the state of the input signal. The input signal and its inverse are assumed to be square voltage waveforms making very fast transitions between zero volts and +Vcc volts. These waveforms are shown in FIG. 4. As shown there, the five analysis periods cover two complete cycles of the input signal; and, as the analysis shows, one complete cycle of the output signal.

In the first analysis period, Q is assumed high and T' is assumed low, while T is assumed low and T' high. Referring to the circuit diagram, FIG. 5, the transistor 41 is on because it is a P-channel device, its source is connected to a positive voltage supply 60 and its gate is held low by the application of the input signal T at the terminal 14*b*. Transistors 54 and 61 are off because they are N-channel devices and their gates and sources are both low. Since transistor 41 is on, the common drain connection of transistors 40 and 41 is high. Transistors 51 and 42 are P-channel devices, their sources and their gates are high due to the drain of transistor 41 and the application of T' respectively, so they are off. Transistor 46, an N-channel device, has its gate high due to T', and its source tied to ground level. It consequently is on, and its drain therefore is also at ground level. Since a stable state has been assumed, the circuit points marked Q can be assumed to be high and the circuit points marked Q' can be assumed to be low. Since the source of transistor 53, an N-channel device, is held low by the drain of the transistor 46, and its gate is held high by the transistor 40, it is on. Its drain then is also low thus holding Q' in its assumed low state. Transistors 55 and 56 form a simple inverter with their common gates held low by the drain of the transistor 53. The transistor 56 is an N-channel device with its source tied to ground, so it is off. The transistor 55 is a P-channel device with its source tied to the positive voltage supply 60 and therefore is on. The common drain connection of the transistors 55 and 56 is then high, holding Q in the assumed stable high state. The transistor 50 is off because it is a P-channel device, its source is held high by the drain of the transistor 41, and its gate is also high due to the action of the inverter pair comprising the transistors 55 and 56. Since the sources of the transistors 42 and 43 are common to the sources of the transistors 50 and 51 and the transistors 40 and 41, they are high also. The gate of the transistor 43 is tied to the output point Q' which is low. Because it is a P-channel device, its source is high and its gate is low. Therefore, it is on. The common drain connection of the transistors 42 and 43 is then also high. The other transistors 47 and 48 form another inverter, with their common gate connection held high by the drain of the transistor 43. The N-channel device, the transistor 48, is consequently on, and the P-channel device, the transistor 47, is off causing their common drain connection to be low. Since the transistor 40, a P-channel device, has its source tied high and its gate held low by the drains of the transistors 47 and 48, it is on. The transistors 52 and 44 are N-channel devices. Their sources are connected to the drains of the transistors 54 and 61 which have been shown to be off. Therefore, since no current can flow down through the drains of the transistors 54 and 61, no current can flow through the drains of the transistors 52 and 44. They must be off. Lastly, the transistor 45, an N-channel device has its source held low by the drain of the transistor 46 but has its gate also held low by the signal Q'. Accordingly, it is off.

To summarize the state of the circuit at the conclusion of the first analysis period; it has been found that the transistors 40, 41, 43, 55, 48, 53 and 46 are on, while the transistors 50, 51, 42, 56, 52, 44, 45, 54 and 61 and 47 are off.

For the second analysis period, the input signal available at the terminals 14*a* and 14*b* undergoes a transition from the T being low, and T' being high state to the T being high, and T' low state. To analyze the effect of this transition, the devices connected directly to the input signal must be investigated first. The transistors 54 and 61 are turned on, because they are N-channel devices and their gates are caused to go high due to T. The transistor 41, a P-channel device, was on and now turns off because its gate also goes high due to T. The transistor 46, an N-Channel device, was on and turns off because its gate goes low due to T'. Since the transistor 40 is still on because its gate level has not changed, the common drain connection of the transistors 40 and 41 is still held high. The common source connections of the transistors 50 and 51 and the transistors 42 and 43 therefore are still high. The common gate connection of the transistors 51 and 42 goes low due to T', so they turn on. When the transistor 51 turns on, its drain goes high and consequently the common gate connection of the inverter transistors 55 and 56 goes high. This circuit point is the output Q' signal, which now goes high. This action causes the transistor 43, which was on, to turn off because it is a P-channel device and its gate goes high. It also causes the gate of the transistor 45, an N-channel device, to go high, however the transistor 45 cannot turn on because its source is tied to the drain of the transistor 46 which is off. According to the inverter operation discussed in period one, the common drain connection of the transistors 55 and 56 goes low. This circuit point is the output signal Q. This change in turn causes the transistor 50, a P-channel device, to turn on; and the transistors 54 and 61 turn on and their drains go low; consequently causing the sources of the transistors 52 and 44 to go low, neither the transistor 52 nor the transistor 44 turn on because their gates are still held low by the transistors 47 and 48 inverter pair.

As a result of the first input signal transition then, transistors 50, 51, 42, 56, 54 and 61 were off and turn on, while transistors 41, 43, 55, 53 and 46 were on and turn off. The output signal goes from the high state to the low state and simultaneously the output Q' goes from the low state to the high state. This is consistent with FIG. 4, and there are no other circuit changes.

In the third analysis period, the input signal returns to the T low, T' high state. The circuit changes again initiate with the devices which are tied directly to the input signal lines. The transistors 54 and 61 were on, their gates now go low, and they turn off. The transistor 41 was off and now turns back on because of the low level at its gate due to T. The transistor 46 was off and, due to the high level developed at its gate by T', turns on; while the transistors 51 and 42 turn off due to T' on their gates. With the transistor 46 on, its drain, and hence the common sources of the transistors 53 and 45 go low. The gate of the transistor 45 is still high due to the drain of the transistor 50 which is still on, so it also turns on and its drain goes low. The transistor 43 is still off for the same reason as in period two, and since the transistor 42 is now also off, their common drain connection is free to go low due to the action of the transistor 45. According to the inverter operation, the common drain connection of the transistors 47 and 48 goes high because their common gates went low due to the transistor 45. This puts a high level at the gates of the transistors 52 and 44 but they do not turn on because the transistors 54 and 61 are off. The transistor 40 turns off because its gate went high; however the transistor 41 is now on thus holding the common drain connection of the transistors 40 and 41 high.

During the third period then, the transistors 41, 47, 45 and 46 were off and turn on, while the transistors 40, 51, 42, 48, 54 and 61 were on and turn off. No other circuit changes occur, and no changes occur in the output signals Q and Q'. This is also consistent with FIG. 4.

For the fourth period, the input signal T once again goes high while T' goes low. The transistors 54 and 61 again turn on and the transistor 41 turns off for the reasons mentioned in the second period. Due to the transition of T', the transistor 46 turns off. Since the transistor 40 turned off in the last period and the transistor 41 turns off now, the common drain connection at the transistors 40 and 41 is no longer held high. The transistors 51 and 42 consequently, even though their gates go low, cannot turn on because current cannot pass through the transistors 40 and 41. Neither the transistor 50 nor the transistor 43 can remain on or turn on for this same reason. Since the gates of the transistors 52 and 44 are still high and since current can now pass down through the transistors 54 and 61, which have just turned on, the transistors 52 and 44 turn on. The drains of the transistors 52 and 44 thus both go low. This action holds the inverter pair of transistors 47 and 48 in the same state they were in during the third period and causes the circuit output signal Q' to go low. This in turn causes the level on the gates of inverter pair of transistors 55 and 56 to go low and, according to inverter action, causes the common drain connection of the transistors 55 and 56 to go high. Thus, the circuit output signal Q goes high. The transistor 45 turns off because its gate goes low as a result of the Q' transition.

The fourth period input signal transition then causes the transistors 56, 52, 44, 54 and 61 which were off to turn on and causes the transistors 41, 50, 55, 45 and 46 which were on to turn off. The circuit output signal Q goes high and the circuit output signal Q' goes low as per FIG. 4.

In the fifth period, T returns low, and T' goes high. The transistor 41 once again turns on and the transistors 54 and 61 turn off. The transistor 46 turns on due to T' causing its drain to go low as well as the source of the transistor 53. The gate of the transistor 53 is held high by the drains of the transistors 55 and 56 inverter and thus turns on. Q' hence remains low and Q remains high. Since the transistor 41 turned on and its drain went high, and since the gate of the transistor 43 is still held low by the action of the transistor 53, the transistor 43 turns on. The common drain connection of the transistors 42 and 43 goes high as well as the gates of inverter pair of transistors 47 and 48. The common drain connection of the transistors 47 and 48 thus goes low turning on the transistor 40. The transistors 52 and 44 turn off due to the low level at their gates and due also to the fact that the transistors 54 and 61 are now off.

During the fifth period, the transistors 40, 41, 43, 48, 53 and 46 were off and turn on while the transistors 47, 52, 44, 54 and 61 which were on, turn off. By the fifth period then the circuit is in a final stable state where the transistors 40, 41, 43, 55, 48, 53 and 46 are on while the transistors 50, 51, 42, 47, 56, 52, 44, 45, 54 and 61 are off. This is the same as the stable state which was determined in period one. Thus, the effects of two complete input signal cycles have been analyzed, and one complete output period has been determined. As can be seen in the waveform drawings, FIG. 4, the flip-flop is capable of dividing the frequency of an input signal by two.

Figure 10:
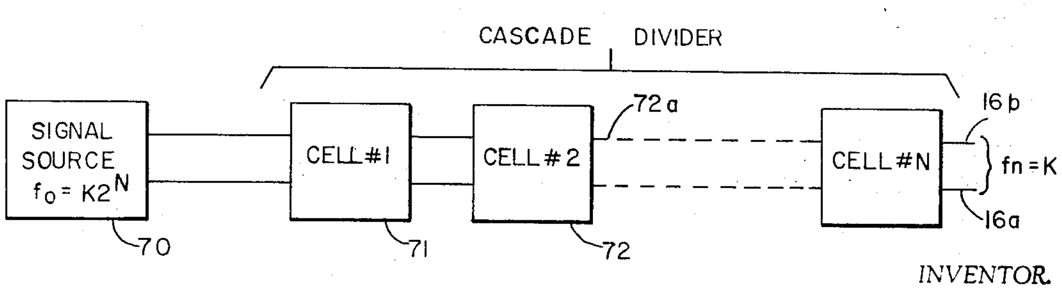
FIG. 10 shows a block diagram of a cascaded frequency divider system.

This invention in the cascaded frequency divider configuration is shown in FIG. 10. In this configuration a number of cells, each equivalent to the flip-flop circuit just discussed, are connected in cascade and the output of one cell to the input of the next. A signal and its inverse are developed from a source such as a quartz crystal oscillator 70 or an astable multivibrator, and are presented to the inputs of a first cell 71 in the divider. The output of the first cell is one half the frequency of the source signal according to the preceeding discussion and is presented to the inputs of a second cell 72. This second cell 72 divides its input frequency by two and hence the source signal by four. The output of the second cell is presented to the input of the next and likewise down the chain. The output of the cascaded chain will be a square wave whose frequency is the source signal frequency divided by $2^N$ where N is the number of cells in the chain. Any final output frequency is obtainable with this divider since the input frequency can be any constant times the number 2 raised to a power, and all intermediate frequencies are available from the outputs of the individual cells such as an intermediate frequency, between the input frequency and output frequency, available at a terminal 72*a*.

In summary then, the binary flip-flop constructed according to the present invention comprises a plurality of basic building blocks including an output transfer means section which responds to the applied input signals. Two input signals must be applied to the binary flip-flop. The first of these signals is the pulse train which is to be divided in half and the second of which is the inverse of the first. As is customary in the art, a complete cycle requires a 360°phase reversal of the signal. Accordingly, one cycle of the input signals shown on lines A and B of FIG. 4 comprise one time period at a first level and a second time period at a second level. The output signal reverses between time periods. Since the present invention operates with other than square wave input signals, the above language is intended to include a wide range of input signals. For convenience, an enabling signal is a logical one or a high voltage level and a disabling signal is a logical zero or a lower voltage level. The output transfer means responds to the input pulse trains by reversing the level of its own output signal in response to the incoming pulse train for the first time period of the incoming pulse train. Additionally, the output transfer means maintains in the second time period its output signal as generated during the first time period. In this manner, the output frequency rate is one half of the input frequency rate.

In order for the output transfer means to operate in the manner previously described, it must have a mechanism for remembering the state from which is just reversed. The memory means provides just such a function and it includes means for preventing the reversal of the output signal from the memory means coincidently with the reversal of the output signal from the output transfer means. In this manner, it is one time period behind the reversal of the output signal from the output transfer means and in this manner remembers continuously for the next cycle, the previous state of the output transfer means. Additionally, the memory means includes a means for reversing the output signal of the memory means during the next time period. In this manner, the output signal from the memory means follows the polarity of the output signal of the output transfer means by one time period.

More specifically, in order for the output transfer means to function as previously described, the gate 18 enables a reversal of the output signal available at terminals 16*a* and 16*b* during the first time period of the applied input signal shown in lines A and B of FIG. 4 occurring at time zero. Additionally, the gate 18 prevents reversal of the output signal available at lines 16*a* and 16*b* for the second time period. Gate 20 functions during the first time period to enable a reversal of the output signal available at terminals 16*a* and 16*b* in response to the input signal available from the memory means 12 so that the output transfer means is switched into the status of that indicated by the memory means. The gate 20 disables during the second time period the memory means signal from reversing the output signal available from the output transfer means.

In order for the memory means to function as previously mentioned, the gate 20 disables, during the first time period, the reversal of output signal of the memory means coincidently with a reversal of the output signal from the output transfer means. The gate 20 during the second time period, enables a reversal of the output signal from the memory means. The gate 28 functions during the first time period to hold the present status of the memory means during a change in the output of the output transfer means. During the second time period, the gate 28 allows the memory means to assume the status of the output transfer means in the second time period.

While the invention has been particularly shown and described with reference to a preferred embodiment thereof, it will be understood by those skilled in the art that changes in form and details may be made therein without departing from the spirit and scope of the invention.

What is claimed is:

1. A binary flip-flop of the type functioning to provide an output signal at one half the frequency of an input signal, wherein the input signal includes a first input signal, and a second input signal which is the inverse of said first input signal, and said first signal is a bi-level input pulse train comprising a series of repetitive cycles and each of said cycles includes a first time period corresponding to a first of said levels and a second time period corresponding to a second of said levels, the improvement comprising:

a memory means having a first output signal for indicating during one time period the level of said first input signal during the immediately preceeding time period and for maintaining said indication for an additional time period; and an output transfer means responsive to said first input signal and to said second input signal and to said first output signal for generating a second output signal and a third output signal corresponding to one half the frequency of said first input signal and to said second input signal respectively, and said second output signal being a bi-level series of repetitive cycles and said third output signal being the inverse of said second output signal.

2. The invention as recited in claim 1, wherein said memory means comprises:

first means for preventing during said first time period a reversal of said output level of said first output signal coincident with a reversal of said output level of said second output signal; and second means for reversing during said second time period said output level of said first output signal.

3. The invention as recited in claim 1, wherein said output transfer means comprises:

first means for causing during said first time period a reversal of said output level of said second output signal; and second means for maintaining during said second time period said level of said second output signal established during said first time period.

4. The invention as recited in claim 2, wherein said memory means is fabricated with field effect transistors and comprises:

a source of potential having a first potential level and a second level of potential and said first level being more positive than said second level;

a plurality of P-channel and N-channel field effect transistors and each having source, gate and drain electrodes;

a first P-channel transistor having its source connected to said first potential level and having its gate connected to said first input signal;

a first N-channel transistor having its source connected to said second potential level and having its gate connected to said first input signal;

a second N-channel transistor having its source connected to said drain of said first N-channel transistor;

a second P-channel transistor having its gate connected to a first junction with said gate electrode of said second N-channel transistor and having its source connected to said first potential level and having its drain connected to a second junction with said drain of said first P-channel transistor;

a third P-channel transistor having its source connected to said second junction and having its drain connected to a third junction with said drain of said second N-channel transistor;

a third N-channel transistor having its drain connected to said third junction and its gate connected to said gate of said third P-channel transistor and responsive to said second output signal;

a fourth N-channel transistor having its drain connected to said source of said third N-channel transistor and having its source connected to said second level of potential and having its gate responsive to said second input signal;

a fourth P-channel transistor having its source connected to said second junction and having its drain connected to said third junction and having its gate responsive to said second input signal;

a fifth P-channel transistor having its source connected to said first potential level and having its gate connected to said third junction and having its drain connected to said first junction;

a fifth N-channel transistor having its gate connected to said third junction and having its drain connected to said first junction and having its source connected to said first potential level whereby, said first junction is the output signal of said memory means.

5. The invention as recited in claim 3, wherein said output transfer means is fabricated with field effect transistors and comprises:

a source of potential having a first potential level and a second level of potential and said first level being more positive than said second level;

a plurality of P-channel and N-channel field effect transistors and each having source, gate and drain electrodes;

a first P-channel transistor having its source connected to said first potential level and having its gate connected to said first output signal;

a first N-channel transistor having its source connected to said second potential level and having its gate connected to said first input signal;

a second N-channel transistor having its source connected to said drain of said first N-channel transistor and having its gate connected to said first output signal;

a second P-channel transistor having its gate connected to a first junction with said gate electrode of said first N-channel transistor and having its source connected to said first potential level and having its drain connected to a second junction with said drain of said first P-channel transistor;

a third P-channel transistor having its source connected to said second junction and having its drain connected to a third junction with said drain of said second N-channel transistor;

a third N-channel transistor having its drain connected to said third junction and its gate connected to said gate of said third P-channel transistor and responsive to said third output signal;

a fourth N-channel transistor having its drain connected to said source of said third N-channel transistor and having its source connected to said second level of potential and having its gate responsive to said second input signal;

a fourth P-channel transistor having its source connected to said second junction and having its drain connected to said third junction and having its gate responsive to said second input signal;

a fifth P-channel transistor having its source connected to said first potential level and having its gate connected to said third junction and having its drain connected to a fourth junction;

a fifth N-channel transistor having its gate connected to said third junction and having its drain connected to said fourth junction and having its source connected to said first potential level whereby, said fourth junction is the third output signal of said output transfer means and said third junction provides said second output of said output transfer means.

6. A binary flip-flop of the type fabricated with field effect transistors and functioning to provide an output indicia at one half the frequency of an input signal indicia comprising:

a source of potential having a first potential level and a second potential level and said first level being more positive than said second level;

an input signal including a first input signal and a second input signal which is the inverse of said first input signal;

a plurality of P-channel and N-channel field effect transistors and each having source, gate and drain electrodes;

a first N-channel transistor having its source connected to said second level and its drain connected to a first junction and its gate connected to a second junction;

a first P-channel transistor having its drain connected to said first junction and having its gate connected to said second junction and having its source connected to said first level;

a second N-channel transistor having its gate connected to said first junction and having its drain connected to said second junction and having its source connected to a third junction;

a second P-channel transistor having its gate connected to a first junction and having its drain connected to said second junction and having its source connected to a fourth junction;

a third P-channel transistor having its source connected to said fourth junction and having its drain connected to said second junction;

a fourth P-channel transistor having its source connected to said first potential level and having its drain connected to said fourth junction and having its gate connected to a fifth junction;

a fifth P-channel transistor having its source connected to said first potential level and having its drain connected to said fourth junction and having its gate responsive to said first input signal;

a sixth P-channel transistor having its source connected to said fourth junction and having its drain connected to a sixth junction and having its gate connected to said gate of said third P-channel transistor and of said two last mentioned gates responsive to said second input signal;

a seventh P-channel transistor having its source connected to said fourth junction and having its drain connected to said sixth junction and having its gate connected to said second junction;

a third N-channel transistor having its drain connected to said third junction and having its source connected to said second potential level and having its gate responsive to said second input signal;

a fourth N-channel transistor having its drain connected to said second junction and having its gate connected to said fifth junction;

a fifth N-channel transistor having its drain connected to said source of said fourth N-channel transistor and having its source connected to said second potential level and having its gate responsive to said first input signal;

a sixth N-channel transistor having its drain connected to said sixth junction and having its gate connected to said fifth junction;

a seventh N-channel transistor having its source connected to said second potential source and having its drain connected to said source of said sixth N-channel transistor and having its gate responsive to said first input signal;

an eighth N-channel transistor having its drain connected to said sixth junction and having its source connected to said third junction and having its gate connected to said second junction;

an eighth P-channel transistor having its source connected to said first potential level and having its gate connected to said sixth junction and having its drain connected to said fifth junction;

a ninth N-channel transistor having its gate connected to said sixth junction and having its drain connected to said fifth junction and having its source connected to said second potential level;

said fifth junction being a first output signal;

said second junction being a second output signal; and said first junction being a third output signal.

7. A multistage divider wherein each stage comprises a binary flip-flop according to claim 6, wherein said first input signal and said second input signal of the second stage comprises the second and third output signals from the first stage.

8. A binary flip-flop comprising first, second, third and fourth AND gates, each of said AND gates having two input terminals and an output terminal;

first and second NOR gates, each of said NOR gates having two input terminals and an output terminal;

first and second inverters, each of said inverters having an input terminal and an output terminal;

means for connecting the output terminals of said first and second AND gates respectively to the input terminals of said first NOR gate;

means for connecting the output terminal of said first NOR gate to the input terminal of said first inverter;

means for connecting the output terminal of said first inverter to a first input terminal of said first AND gate;

means for connecting the output terminals of said third and fourth AND gates respectively to the input terminals of said second NOR gate;

means for connecting the output terminal of said second NOR gate to the input terminal of said second inverter;

means for interconnecting first input terminals of said second and fourth AND gates;

means for interconnecting a second input terminal of said first and third AND gates;

means for connecting the first input terminal of said third AND gate to the output terminal of said first NOR gate; and means for connecting the output terminal of said second inverter to the second input terminals of said second and fourth AND gates, whereby the binary inputs to said flip-flop are applied at said two interconnecting means, with the outputs of said flip-flop being available at the input and output terminals of said first inverter.

9. A binary flip-flop of the type functioning to provide an output signal at one half the frequency of an input signal, wherein the input signal includes a first input waveform and a second input waveform which is the inverse of said first input waveform, and said first input waveform is a bi-level input pulse train comprising a series of repetitive cycles and each of said cycles includes a first time period corresponding to a first of said levels and a second time period corresponding to a second of said levels, the improvement comprising:

a memory means having a first output signal for indicating during one time period the level of said input waveform during the immediately preceeding time period, and for maintaining said indication for an additional time period;

an output transfer means having a second output signal corresponding to one half the frequency of said first input waveform and having a third waveform which is the inverse of the waveform of said second output signal;

said memory means responsive to said first input waveform and to said second input waveform and to said first output signal and to said second output signal, for preventing the reversal of the output level of said first output signal coincident with the reversal of the output level of said second output signal during said first time period, and for generating a first output signal having an output level equal to said third output waveform during said second time period; and said output transfer means responsive to said first input waveform and to said second input waveform and to said first output signal and to said third output waveform for forcing during said first time period said third output waveform to change output level, and for maintaining during said second time period said output level, established during said first time period;

whereby, said first output signal and said third output change levels asynchronously.

10. The invention as recited in claim 9, wherein said memory means further comprises:

first means responsive to said second output signal and to said second input waveform for preventing during said first time period the reversal of the output level of said first output signal coincident with the reversal of the output level of said second output signal, and for generating during said second time period a first output signal of the same output level as said third output signal;

second means responsive to said first output signal and to said first input waveform for maintaining in said first time period the output level of said first output signal during a reversal in levels in said second output waveform, and for allowing in said second time period said output level of said first output signal to equal the output level of said third output signal; and first summing means including polarity reversal means for developing said output signal.

11. The invention as recited in claim 9, wherein said output transfer means further comprises:

first means responsive to said third output signal and said second input waveform for allowing during said first time period a reversal of said output level of said third output signal;

and for maintaining during said second time period the output level of said third output signal established during said first time period;

second means responsive to said first output signal and said first input waveform, for causing during said first time period a reversal of said output level of said third output signal as indicated by said first output signal, and for inhibiting during said second time period, a changing of said output level of said third output signal in response to said first output signal;

summing means for developing said second output signal; and polarity reversal means for developing said third output signal.

12. A multistage divider wherein each stage comprises a binary flip-flop according to claim 9;

wherein said first input signal and said second input signal of the second stage comprises the second and third output signals from the first stage.

* * * * *